Dec. 24, 1940.    C. G. VRETMAN    2,226,453
PUNCTUREPROOF TUBE FOR TIRES
Filed Nov. 19, 1938
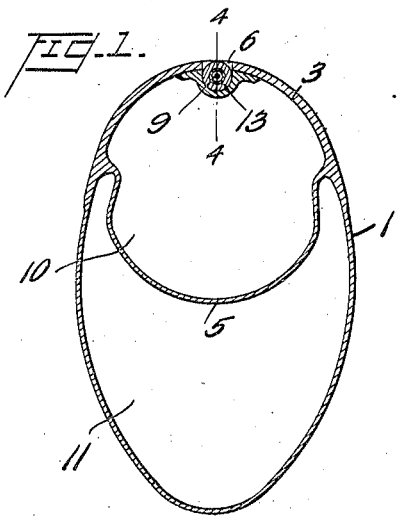
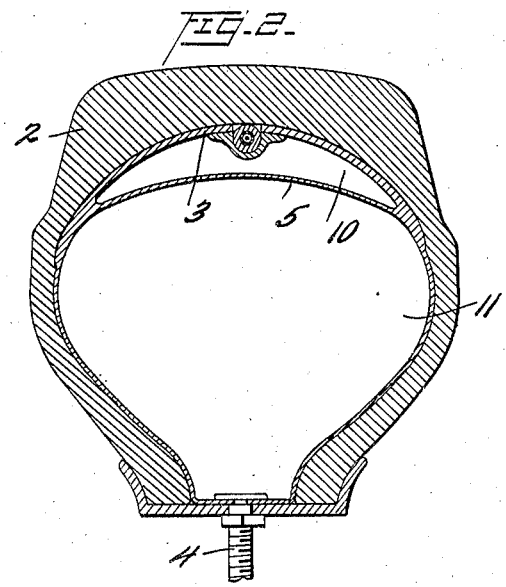
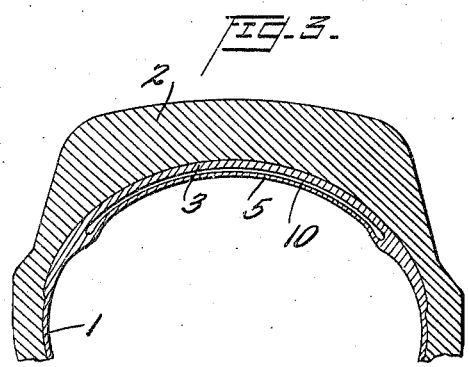
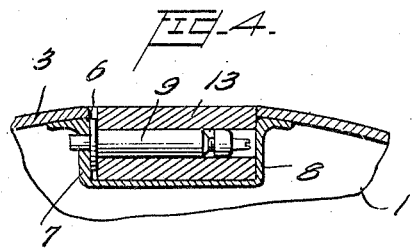
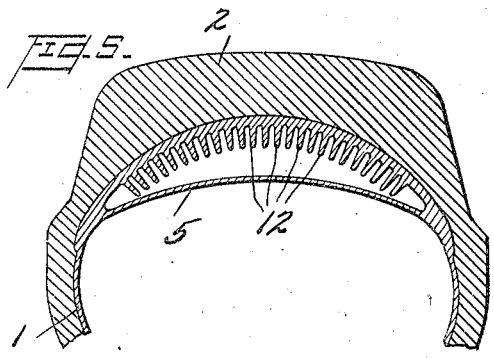
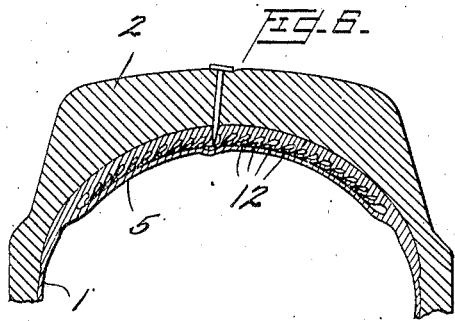
Inventor
Carl G. Vretman,
By Robert H. Young
Attorney Patented Dec. 24, 1940

2,226,453

UNITED STATES PATENT OFFICE 2,226,453

PUNCTUREPROOF TUBE FOR TIRES

Carl G. Vretman, Atlanta, Ga.

Application November 19, 1938, Serial No. 241,415

3 Claims. (Cl. 152—339)

My invention relates to improvements in punctureproof tubes for tires.

The object of my invention is to provide an inner tube having an auxiliary air space arranged circumferentially around its outer wall and so constructed, that in the event the same is punctured, the pressure in the main air space will force the outer wall thereof into the auxiliary air space and form a completely inflated tire of slightly less pressure.

Another object of my invention is to provide a tube of this character in which the auxiliary air space may be supplied with comparatively low initial inflation before the tube is placed in the casing. The subsequent placing of the tube in the casing and inflation of the main air space, after having reached the same pressure as that of the initial previously inflated auxiliary air space will then be the same on each side of the partition until full inflation is accomplished.

A further object of my invention is to provide means within the auxiliary air space to prevent nails or the like, which may enter the same, from passing through the wall between the auxiliary and main air spaces and thus prevent the puncturing of the main air space.

A still further object of my invention is to provide a tube of this character which may be used on any standard make of casing, and at the same time providing a simple construction, with safety in operation, and having certain details of structure and operation hereinafter more fully set forth.

In the drawing—

Figure 1 is a transverse sectional view of my improved tube—showing the auxiliary air space inflated;

Figure 2 is a transverse sectional view of a casing—showing my tube therein and the tube fully inflated, and the tire ready for use;

Figure 3 is a transverse sectional view similar to Figure 2—showing the auxiliary space deflated after a puncture and the wall of the main air space forced into the same;

Figure 4 is a longitudinal sectional view taken on the line 4—4 of Figure 1;

Figure 5 is a transverse section of a modified form of tube;

Figure 6 is a transverse sectional view of the form of tube shown in Figure 5—showing the auxiliary air space deflated after a puncture.

It is well known that most tire trouble is caused by nails or the like entering the outer casing of the tire sufficiently far to puncture the inner tube and is then thrown from the tire by centrifugal force or the working of the tire. In my improved tube the auxiliary air space only is punctured and the nail or the like is thrown from the tire before it can enter the wall between the 5 air spaces.

Referring now to the drawing, 1 represents the ordinary inner tube; but, as shown in my invention, the outer portion thereof which abuts the tread of the outer casing 2, is thickened, as indicated at 3, for a purpose hereinafter more fully described. The tube 1, at its inner periphery, is provided with the usual valve stem and valve 4, by means of which the tube is inflated in the usual manner and needs no further description.

The tube 1, adjacent its upper thickened portion 3, is provided with a partition 5, as shown in Figure 1 of the drawing, which divides the tube into an auxiliary air space 10 and a main air space 11. The outer thickened wall 3 of the tube is provided with an elongated recessed portion 6, having vertical end walls 7 and 8. Secured within the end wall 7 of the recess is a valve stem 9 which carries an inflating valve, and said valve stem lies longitudinally in the recess when the tube is in the casing. By this arrangement it will be seen that the auxiliary air space 10 is inflated through the valve stem 9, while the main air space 11 is inflated through the valve stem 4.

The wall 3, as heretofore stated, is thickened and must be sufficiently thick so as not to expand when the space 10 is inflated to approximately ten pounds' pressure. The wall 5, however, must be of less thickness to take up the expansion, but must be thick enough so that the space 10 will not be too large to be inserted into the tire casing. While inflating the outer auxiliary space 10 it might be necessary to keep the valve 4 open so that the space 11 will not be expanded, and thus allow the ready insertion of the tube in the tire casing.

In the use of the tube the auxiliary air space 10 is inflated through the valve stem 9 until a pressure of approximately ten pounds is obtained therein, which causes the partition 5 to assume the position shown in Figure 1 of the drawing. After its insertion in the casing the main air space 11 is then inflated to the desired number of pounds of pressure. This pressure causes the partition 5 to be forced outwardly resulting in an increased pressure in the auxiliary space 10 until the partition has reached a point of approximately that shown in Figure 2—when the pressure in both the main and the auxiliary spaces are equal.

In order to prevent the lower wall of the recessed portion 6 from being expanded outwardly against the metal valve stem 9, I provide a rubber sleeve 13 which is of a size to approximately fill the recessed portion 6.

Should a nail or the like pass through the casing and puncture the outer wall of the outer or auxiliary space 10, and then by centrifugal force be thrown or in some way worked out of the tire, the wall 5, by the air pressure in the main air space 11, would then be forced outwardly in the position shown in Figure 3, and the entire tire would still be inflated with a slightly less pressure. The expansion of space 11 will take place with the same speed and proportion as the deflation or collapse of space 10, so that the actual fact a puncture has taken place will not be noticeable to the occupants of a car.

In the modification shown in Figure 5 the wall of the outer or auxiliary air space 10 is provided with vanes 12 which are closely associated and designed to assume the position shown in Figure 6. In case a nail or other object penetrates the casing and wall 3 of the tube, and remains in the casing, these vanes would protect the wall 5 from also being punctured.

Having thus described my invention, what I claim as new is—

1. An inner tube for tires comprising a body portion divided into inner and outer circumferentially continuous air space, a valve arranged in a depression in the outer wall of the outer air space for inflating the same, and a valve for inflating the inner air space through its inner wall.

2. An inner tube for tires comprising a body portion divided by a partition into inner and outer circumferential continuous air spaces, the outer wall of the outer air space having an inwardly depressed portion, a valve in said depressed portion for inflating the outer air space, and a valve carried by the inner wall of the inner air space for inflating the same.

3. An inner tube for tires comprising a body portion divided by a partition into inner and outer circumferential continuous air spaces, the outer air space having an inwardly depressed portion, a valve in said depressed portion for inflating the outer air space, a rubber sleeve surrounding the valve and filling the depressed portion, and a valve carried by the inner wall of the inner air space for inflating the same.

CARL G. VRETMAN.